United States Patent
Schumann et al.

(10) Patent No.: US 11,020,908 B2
(45) Date of Patent: Jun. 1, 2021

(54) METHOD FOR ADDITIVE MANUFACTURING THREE-DIMENSIONAL OBJECTS WHEREIN AT LEAST ONE OPEN SUB-DATA SET IS CHANGEABLE BY USER TO COMPRISE OBJECT SPECIFIC IDENTIFICATION NUMBER

(71) Applicant: CONCEPT LASER GMBH, Lichtenfels (DE)

(72) Inventors: Philipp Schumann, Itzgrund-Schottenstein (DE); Timo Voigt, Erlangen (DE)

(73) Assignee: CONCEPT LASER GMBH, Lichtenfels (DE)

( * ) Notice: Subject to any disclaimer, the term of this patent is extended or adjusted under 35 U.S.C. 154(b) by 0 days.

(21) Appl. No.: 16/294,903

(22) Filed: Mar. 6, 2019

(65) Prior Publication Data
US 2020/0215758 A1    Jul. 9, 2020

(30) Foreign Application Priority Data

Jan. 9, 2019 (EP) ..................... 19151042

(51) Int. Cl.
  *B29C 64/393* (2017.01)
  *B29C 64/153* (2017.01)
  (Continued)

(52) U.S. Cl.
  CPC ............ *B29C 64/393* (2017.08); *B22F 10/00* (2021.01); *B29C 64/153* (2017.08); *B22F 10/10* (2021.01);
  (Continued)

(58) Field of Classification Search
  CPC .................................................... B29C 64/393
  (Continued)

(56) References Cited

U.S. PATENT DOCUMENTS 10,331,111 B2 * 6/2019 Cluckers ............ G06Q 30/0621
10,459,430 B2 * 10/2019 Levine .................. G06F 3/1243
(Continued)

FOREIGN PATENT DOCUMENTS

WO   WO2016/077326 A1   5/2016

OTHER PUBLICATIONS

European Search Report Corresponding to EP19151042 dated Jun. 25, 2019.

*Primary Examiner* — Suresh Suryawanshi
(74) *Attorney, Agent, or Firm* — Dority & Manning, P.A.

(57) ABSTRACT

Method for additively manufacturing three-dimensional objects (1) based on build data, in particular via successive layerwise selective irradiation and consolidation of layers of a build material which can be consolidated by means of an energy source, which build data define at least one part of an object (1) to be built in the additive manufacturing process, in particular a geometrical structure of the object (1), wherein build data are generated comprising at least two sub-data sets (3, 4) relating to different geometrical parts of the object (1); at least one sub-data set (3, 4) is defined as open sub-data set (4); all sub-data sets (3) except the at least one open sub-data set (4) are locked, wherein the locked sub-data sets (3) are unchangeable and the at least one open sub-data set (4) is changeable; and at least one three-dimensional object (1) is additively manufactured based on the build data.

19 Claims, 1 Drawing Sheet

(51) Int. Cl.
*B22F 10/00* (2021.01)
*B33Y 10/00* (2015.01)
*B33Y 30/00* (2015.01)
*B33Y 50/02* (2015.01)
*B29C 64/371* (2017.01)
*B22F 10/10* (2021.01)

(52) U.S. Cl.
CPC ......... *B22F 2201/11* (2013.01); *B29C 64/371* (2017.08); *B33Y 10/00* (2014.12); *B33Y 30/00* (2014.12); *B33Y 50/02* (2014.12)

(58) Field of Classification Search
USPC .......................................................... 700/98
See application file for complete search history.

(56) References Cited

U.S. PATENT DOCUMENTS

| | | | |
|---|---|---|---|
| 2016/0185043 A1* | 6/2016 | Klappert | B29C 67/0088 |
| | | | 264/40.1 |
| 2016/0202691 A1* | 7/2016 | Pettersson | G05B 19/41865 |
| | | | 700/98 |
| 2017/0038767 A1* | 2/2017 | Cluckers | G06Q 30/0621 |
| 2017/0072639 A1 | 3/2017 | Levine et al. | |
| 2017/0255171 A1 | 9/2017 | Avula et al. | |
| 2017/0336778 A1* | 11/2017 | Patry | G06Q 30/012 |
| 2019/0134897 A1* | 5/2019 | Williams | G01N 21/33 |
| 2019/0375049 A1* | 12/2019 | Werner | B33Y 50/02 |
| 2020/0004225 A1* | 1/2020 | Buller | G05B 19/4099 |
| 2020/0147890 A1* | 5/2020 | Torrington | B29C 64/393 |
| 2020/0160612 A1* | 5/2020 | Bowen | G06Q 30/00 |

\* cited by examiner

METHOD FOR ADDITIVE MANUFACTURING THREE-DIMENSIONAL OBJECTS WHEREIN AT LEAST ONE OPEN SUB-DATA SET IS CHANGEABLE BY USER TO COMPRISE OBJECT SPECIFIC IDENTIFICATION NUMBER

CROSS-REFERENCE TO RELATED APPLICATIONS

This application claims priority to European Patent Application serial no. 19 151 042.9 filed Jan. 9, 2019, the contents of which is incorporated herein by reference in its entirety as if set forth verbatim.

FIELD OF THE INVENTION

The invention relates to a method for additively manufacturing three-dimensional objects based on build data, in particular via successive layerwise selective irradiation and consolidation of layers of a build material which can be consolidated by means of an energy source, which build data define at least one part of an object to be built in the additive manufacturing process, in particular relating to a geometrical structure of the object.

BACKGROUND

Methods for additively manufacturing three-dimensional objects are generally known from prior art. Typically, a three-dimensional object is built based on build data that define or relate to the geometrical structure of the objects, e.g. defining the cross-section of the object for each layer to be selectively consolidated in a layerwise manufacturing process. Further, it is known that various parameters present during the additive manufacturing process significantly influence the additively built object, for example the object quality, such as mechanical properties of the object. Thus, it is desirable to link the object to the additive manufacturing process, in particular to record the properties or parameters that were present during the additive manufacturing process. Hence, it is possible to verify that certain requirements were met during the additive manufacturing process in which a specific object has been manufactured.

To link the object to a specific manufacturing process, it is, especially with respect to series productions, necessary to generate an identification information on or in the object to properly identify which object was built in which additive manufacturing process and thereby, verify that the quality requirements were met or whether deviations from nominal parameters were present during the additive manufacturing process. Regarding serial productions in which a large number of objects are additively manufactured in large quantities, usually a specific design is verified, which specific design and usually the adjustments to the apparatus are locked and cannot be varied during or in advance the additive manufacturing process. This raises the problem that a change to the build data is not allowed, but the generation of identification information which is individual for each objects necessary to identify the object.

It is an object of the present invention to provide an improved method for additively manufacturing three-dimensional objects, in particular allowing for a generation of an object specific identification information without significantly changing an approved set of build data or a renewed approval.

The object is inventively achieved by a method according to claim 1. Advantageous embodiments of the invention are subject to the dependent claims.

SUMMARY OF THE INVENTION

The method described herein is a method for additively manufacturing three-dimensional objects, e.g. via an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to a method for additively manufacturing three-dimensional objects based on the build data that relate to at least a part of an object to be built in the additive manufacturing process, for example a geometrical structure of the object, wherein it is possible to have multiple build data or build data sets that relate to different parts of the object. The invention is based on the idea that build data comprising at least two sub-data sets relating to different geometrical parts of the object are generated, wherein at least one sub-data set is defined as open sub-data set and all sub-data sets except the at least one open sub-data set are locked, wherein the locked sub-data sets are unchangeable and the at least one open sub-data set is changeable. Subsequently, the at least one three-dimensional object is additively manufactured based on the generated build data.

In other words, the build data that relate to the object to be built, e.g. the three-dimensional shape of the object, are generated, which build data may, inter alia, define the scan path along which an energy beam may be guided to properly irradiate and thereby consolidate the build material to manufacture the object. The build data are afterwards subdivided in at least two sub-data sets which relate to different geometrical parts of the object. For example, one of the at least two sub-data sets may relate to a minor part of the object, e.g. a volume cell, in which during the additive manufacturing process of the object unique or object specific identification information can be generated. Hence, it is possible to define at least one of the at least two sub-data sets as open sub-data set which will be changeable in advance to or even during the additive manufacturing process. All other sub-data sets other than the at least one open sub-data sets are locked in that they may not be changed. Hence, all locked sub-data sets are may not be changed in advance to or during the additive manufacturing process.

Therefore, it is possible that the entire object may be approved or verified regarding the fulfillment of quality requirements and only one sub-data set that, for example, may relate to a minor part of the object can be left changeable, wherein the build data may be generated for the entire object and only the open sub-data set may be changed, for example for generating a serial number or any other arbitrary object specific identification information in the region of the object that is described via the at least one open sub-data set. Hence, after the locking process, it is possible to generate identification information in the part of the object that is defined via the at least one open sub-data set.

In other words, it is possible to change the at least one open sub-data set in that an object specific identification information may be generated in the part of the object that is defined via the open sub-data set. The identification information may, inter alia, be generated in advance to or even during the additive manufacturing process for identifying and linking the object to the specific additive manufacturing process. Subsequently, the three-dimensional object may be additively manufactured based on the build data, as described via the at least two sub-data sets.

Advantageously, it is possible that a specific design may be generated and verified or approved, e.g. by a manufacturer or a user. The specific design is described via the build data, wherein the vast part of the build data may be locked except from the at least one open sub-data set that may relate to a comparatively small region of the object. In the region that is defined by the open sub-data set the identification information can be generated, wherein advantageously only the region defined by the open sub-data set has to be changed and the rest of the build data may remain unchanged, as approved or verified by the user or the manufacturer. Therefore, in large series productions it is not necessary to approve or verify each individual object, but it is possible to verify the general build data representing one object of the plurality of (identical) objects in the series production and only change a minor part of each object for generating the identification information, such as a serial number for each object. This particularly reduces the effort for individually marking each object and linking the object to the specific manufacturing process in which the object was manufactured.

According to a preferred embodiment of the inventive method, each sub-data set may correspond to a volume cell of the object to be manufactured. As described before, the build data, inter alia, describe the geometrical structure of the object, e.g. the cross section and the inner structure or geometry of the object. Hence, each sub-data set in which the build data can be subdivided or which the build data comprise, relates to a different region, e.g. a volume cell, of the object. Hence, the at least one open sub-data set relates to and describes a volume cell of the object in which an identification information can be generated, e.g. in which an object identifier such as a serial number can be generated which is manufactured together with the object during the additive manufacturing process. Afterwards, it is possible to read or determine the object information (identification information) and thereby individually identify the object and relate the object with the additive manufacturing process in which the object was manufactured.

The inventive method may further be improved in that the sub-data sets comprise process information relating to the additive manufacturing process. As described before, the build data and therefore, also the sub-data sets of the build data may comprise geometrical details of the object, wherein it is also possible that the sub-data sets may comprise process information relating to the additive manufacturing process. For example, it is possible to include object specific information or information relating to the additive manufacturing process, such as process parameters, in particular irradiation parameters and the like.

In particular, the process information that may be comprised in the sub-data sets comprises irradiation information and/or consolidation information, in particular at least one scan path. According to this embodiment, it is possible to include the scan path along which an energy beam has to be guided to additively manufacture the three-dimensional object. Thus, it is possible to lock the irradiation information, in particular the scan path for the object by locking all sub-data sets except the open sub-data set. Thus, the scan path does not have to be recalculated after the object information is generated uniquely for the individual object, but it is possible to keep the irradiation information for all locked sub-data sets and only change the irradiation information, such as the calculated scan path, for the at least one open sub-data set. This significantly reduces the effort for calculating the irradiation information, in particular the scan path for each object.

Further, the process information comprised in the sub-data sets advantageously are generated for the entire build data in advance to an additive manufacturing process. As described before, it is possible to generate the process information in advance to an additive manufacturing process, thereby generating build data that describe the geometrical structure of the object and the scan path along which an energy beam has to be guided to properly irradiate the build material and thereby consolidate the build material to form the three-dimensional object. The process information for the whole build data may be generated before the additive manufacturing process is started. For example, build data may be generated and approved for every object in the serial production. Hence, only the open sub-data set has to be recalculated, wherein the object information, e.g. the identification information, can be generated in advance or during the additive manufacturing process. Thus, the general design that has been verified or approved by the user or the manufacturer does not have to be changed and approved again, but it is possible to keep nearly the entire part of the object represented by the locked sub-data sets of the build data locked and only vary a small part of the object and the build data relating to the part of the object represented or defined by the at least one open sub-data set.

According to another embodiment of the inventive method, the part of the object the at least one sub-data set relates to or which it defines can be defined or determined. As described before, the open sub-data set relates to a part of the build data that can be changed after the build data are approved and the build data are locked. Hence, it is possible to determine a part of the object in which the identification information can be generated in the additive manufacturing process or it is possible to define that part of the object. In other words, by defining or determining the open sub-data set it is possible to choose the region or the part of the object to which the open sub-data set relates or that is defined by the open sub-data set.

For example, it is possible that the part of the object the open sub-data set defines or relates to is defined by a designer or a user. For example, the user may choose the part of the object which is referred to by the open sub-data set or which is defined by the open sub-data set. Thus, it is possible that the designer or the user may define the part of the object in which the object information is generated in the additive manufacturing process. For example, based on the experience of the user or the designer it is possible to choose a part of the object that does not significantly influence the performance of the object. For example, the designer or the user may choose a part of the object that receives the object information in which the user or the designer knows only a minor part of the load is received in the part.

Besides, it is also possible to determine the part of the object the open sub-data set defines or relates to via a simulation process. In general, it is possible to determine a part of the object that encounters a specific load in use and/or during the manufacturing process. Hence, a part specific position can be determined in which the object information can be generated and which part a region of the object is defined via the open sub-data set. In particular, the decision which part of the object is defined via the open sub-data set can be performed based on a simulation process, e.g. a load simulation or a stress simulation, in particular thermal stress or mechanical stress, particularly via a FEM simulation. Therefore, it is possible to choose a region or a part of the object that does not encounter a critical load during use or during the manufacturing process, e.g. comparatively high mechanical stress or thermal stress. In other words, it is possible to generate the object information in a part of the object that is not critical for the performance of the object, e.g. in filigree parts of the object or a part of the object that receives a significant load during use or the manufacturing process.

It is particularly preferred that stress is simulated in the object and the sub-data set below a defined stress value, particularly with the lowest stress value, is chosen as sub-data set, in particular thermal stress and/or mechanical stress during the manufacturing process and/or during use. As described before, it is possible to perform a simulation of stress the object encounters during the additive manufacturing process or during use. Subsequently, it is possible to choose a region of the object that is defined via one of the sub-data sets which faces the lowest stress during use or during the manufacturing process. Hence, it is ensured that the object information is generated in a part of the object that is not critical for the performance of the object and that only a part of the object is recalculated and changed that does not significantly influence the overall behavior of the object in terms of a load that has to be received in the object, for instance.

The inventive method may further be improved by selecting a sub-data set as open sub-data set that relates to a part of the object with a defined impact on at least one structural property of the object, particularly the lowest impact, in particular the lowest stress. In other words, of all available sub-data sets that together form the build data for the corresponding object, one sub-data set can be selected as open sub-data set that defines the part of the object with a defined impact on at least one structural property of the object. For example, based on the specific geometry of the object, different parts of the object may have different impact on the structural integrity of the object, for example comparatively thin parts or comparatively filigree parts or dependent on the function of the object parts of the object through which a force is applied onto another object or the like. Hence, it is possible to select a sub-data set as open sub-data set that relates to a part of the object that has the lowest impact on the structural properties of the object, for example a part with a comparatively massive structure or a part that receives the lowest stress during the additive manufacturing process and/or during the use.

Further, it is possible to generate object information in the at least one open sub-data set, wherein the open sub-data set is changed. As described before, it is possible to generate specific object information, such as object information that allows for individually identifying the specific object and relating the object to a specific manufacturing process in which the object was manufactured. By generating the object information in the at least one open sub-data set, the open sub-data set is changed, wherein the locked sub-data sets remain unchanged.

Preferably, the object information may comprise an object specific identifier, particularly a serial number. The serial number directly identifies or allows for identifying the object and further it is possible that the object may be related to the additive manufacturing process in which the object was build based on the object specific identifier. For example, the object specific identifier, particularly the serial number, may involve one or more of an ID code, such as a QR code, a quality indicator, a material, a manufacturer, a version of the object.

According to another embodiment of the inventive method, the object information may be generated in advance to or during a manufacturing process. As described before, the vast part of the object as defined by the build data can remain unchanged and only the comparatively minor part as defined by the open sub-data set can be changed for providing the object with an object specific identifier, such as the object information, particularly a serial number. As the object information is generated in a comparatively small volume cell of the object, the generation of the changes to the open sub-data set can be performed "on-the-fly", in particular in advance to or during a manufacturing process. For example, it is possible that the apparatus that performs the additive manufacturing process to build the three-dimensional object may generate the object information, e.g. the serial number, and place the object information to the specific volume cell or part of the object that is defined via the open sub-data set. As this comparatively small volume cell only requires a minor amount of calculation time it is possible to perform the calculation and therefore, the generation of the object information in advance to or even during a manufacturing process.

The inventive method may further be improved by selecting a sub-data set as open sub-data set that relates to a part of the object that is fully arranged inside the volume of the object. Hence, the open sub-data set does not have contact with the surface of the object, but is entirely received within the volume of the object. Advantageously, it is possible to generate the object information, e.g. a serial number, inside the volume of the object, wherein the object information is not visible from outside the object. The object information may, for example, be generated as variation in a physical property of the object, e.g. a variation in the microstructure or the material of the object in the region that is defined by the open sub-data set.

Besides, the invention relates to a control unit for an apparatus for additively manufacturing three-dimensional objects, wherein the control unit is adapted to generate build data defining at least one part of an object to be built in an additive manufacturing process, in particular a geometrical structure of the object, wherein the control unit is adapted to generate build data comprising at least two sub-data sets relating to different geometrical parts of the object and defining of at least one sub-data set as open sub-data set and locking all sub-data sets except the at least one open sub-data set, wherein the locked sub-data sets are unchangeable and the at least one open sub-data set is changeable.

Further, the invention relates to an apparatus for additively manufacturing three-dimensional objects, comprising an inventive control unit, as described before. Self-evidently, all details, features and advantages described with respect to the inventive method are fully transferable to the inventive control unit and the inventive apparatus. In particular, the inventive method may be performed on the inventive control unit which may be considered part of the inventive apparatus or may be connected or connectable to an inventive apparatus.

BRIEF DESCRIPTION OF THE DRAWINGS

Exemplary embodiments of the invention are described with reference to the Fig. The Fig. are schematic diagrams, wherein.

DETAILED DESCRIPTION

Figure 1:
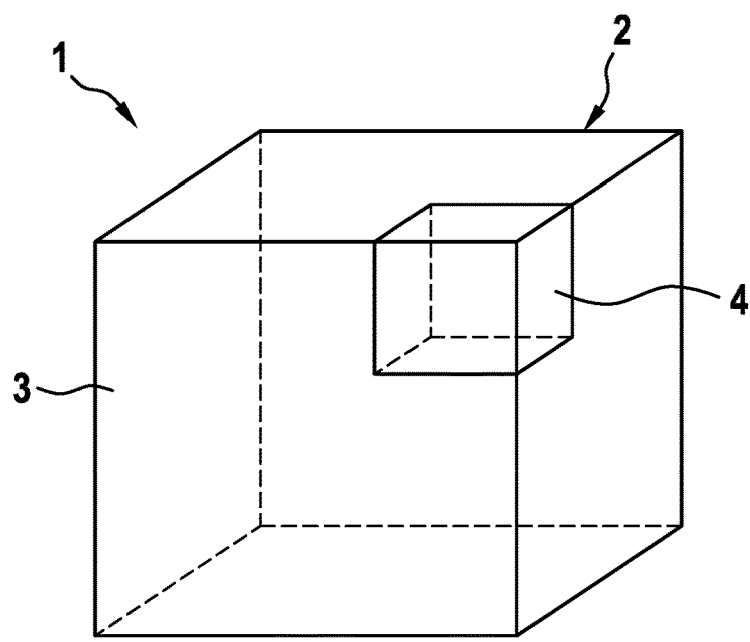
FIG. 1 shows a model of a three-dimensional object to be built.

FIG. 1 schematically shows an object 1 that has to be manufactured in an additive manufacturing process. For the sake of simplicity the object 1 tis represented by a base body 2 shaped as a cuboid. For performing the additive manufacturing process build data are generated that relate to the geometrical structure of the object 1, e.g. the base body 2. The build data, inter alia, comprise the geometrical structure of the object 1 and further process information, in particular irradiation information, such as information relating to the scan paths of an energy beam along which the energy beam is scanned to selectively irradiate the three-dimensional object 1. The build data may be generated comprising at least two sub-data sets 3, 4, wherein the first sub-data set 3 and the second sub-data set 4 are generated in this exemplary embodiment. The sub-data sets 3, 4 relate to different geometrical parts of the object 1.

In this exemplary embodiment, the sub-data set 4 can be defined as open sub-data set. Thus, it is possible to lock the sub-data set 3, wherein the locked sub-data set 3 is unchangeable and the open sub-data set 4 may be changed in advance to or during the additive manufacturing process. Subsequently, it is possible to additively manufacture the at least one three-dimensional object 1 based on the build data.

Figure 2:
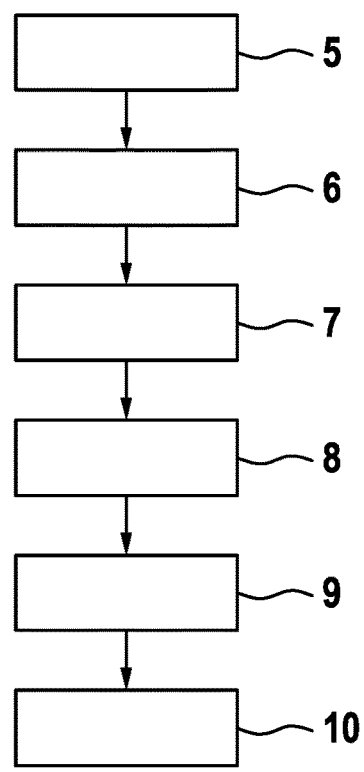
FIG. 2 shows a process diagram of an inventive method.

The inventive method will be described with respect to the process diagram depicted in FIG. 2. In a first step 5 object data are provided that relate to the three-dimensional structure of the object 1 to be additively manufactured. The object data may, for example, involve or comprise CAD data relating to the three-dimensional shape and the structure of the object 1. The object data may, for example, be provided by a user or determined via a three-dimensional scanner or the like.

In a second process step 6 build data may be generated, e.g. comprising the object data and process information, such as irradiation information relating to the scan paths for an energy beam along which build material has to be irradiated and consolidated to additively manufacture the object 1 in a layerwise successive manner. The build data can, for example, be approved and verified by a user or a manufacturer in that the general design of the object 1 is not allowed to be changed.

In a next process step 7 a definition or a determination can be made which of the sub-data sets 3, 4 is chosen as open sub-data set. The definition can, for example, be made by the user or the manufacturer of the object 1, e.g. based on the experience of the user or the manufacturer or the like. It is also possible to perform an analysis or a determination process for determining a part of the object 1 the sub-data sets 3, 4 relates to. In this exemplary embodiment the sub-data set 4 is chosen as open sub-data set 4, wherein based on a determination of the region of the object 1 to which the open sub-data set 4 relates, the sub-data set 4 can be chosen as open sub-data set 4 which can be changed in advance to or even during the additive manufacturing process. The determination process can, for example, be performed based on a stress analysis taking the stress into calculation that is applied on the object 1 during the additive manufacturing process and/or during use of the object 1.

In the following process step 8 the sub-data set 3 is locked. Of course, it is also possible to have a plurality of sub-data sets 3 that can be locked. In other words, the sub-data set 4 which was chosen as open sub-data set 4 is not locked and can be changed afterwards and the sub-data set 3 which is not chosen as open sub-data set is locked and cannot be changed anymore. In other words, the part of the build data linked with the sub-data set 3, e.g. the geometrical structure of the object 1 and the irradiation information comprised in the sub-data set 3 cannot be changed and remains as verified or approved by the user or the manufacturer. Advantageously, it is not necessary to recalculate the build data comprised in the sub-data set 3, but the sub-data set 3 can directly be used for the additive manufacturing process.

The open sub-data set 4 can be changed in the process step 9 in that object information can be generated, such as object information, particularly a serial number. In other words, in the part of the object 1 the open sub-data set 4 relates to or which it defines, an object specific identification information can be generated which is, for example, visible to a user. Thus, it is possible to change the open sub-data set 4 of the build data in that the irradiation information, such as the scan path for an energy beam, can be changed to allow for generating the object specific identification information in the volume cell as defined by the open sub-data set 4.

Subsequently, the object 1 may be additively manufactured in an additive manufacturing process in process step 10. Of course, it is also possible to generate the object information in the open sub-data set 4 during the additive manufacturing process, in particular before the layer comprising the region or a part of the object 1 to which the open sub-data set 4 relates, is manufactured.

Self-evidently, the inventive method, as described via the process steps 5-10 can be performed on an inventive apparatus, particularly comprising an inventive control unit.

The invention claimed is:

1. A method for additively manufacturing three-dimensional objects comprising a plurality of geometrical parts, the method comprising:
   generating build data comprising at least two sub-data sets, wherein the at least two sub-data sets relate to different geometrical parts of the object;

selecting at least one sub-data set as an open sub-data set that is subsequently changeable by a user prior to or during additively manufacturing the at least one three-dimensional object;

locking all sub-data sets that are not open sub-data sets so that locked sub-data sets are subsequently unchangeable by the user prior to or during additively manufacturing the at least one three-dimensional object; and, additively manufacturing a plurality of three-dimensional objects based on the build data comprising at least one open sub-data set and at least one locked sub-data set wherein the at least one open sub-data set is changed by a user to comprise object specific identification information.

2. The method of claim 1, wherein each sub-data set corresponds to a different region of the three-dimensional object defining a different region of the three-dimensional object.

3. The method of claim 1, wherein the at least two sub-data sets comprise process information relating to the additive manufacturing process.

4. The method of claim 3, wherein the process information comprises irradiation parameters.

5. The method of claim 3, wherein the process information comprises at least one scan path.

6. The method of claim 3, wherein the process information is generated prior to additively manufacturing the at least one three-dimensional object.

7. The method of claim 1 further comprising determining a geometrical part of the object related to the open data set.

8. The method of claim 7, wherein determining the geometrical part of the object related to the open data set is determined via the user.

9. The method of claim 7, wherein determining the geometrical part of the object related to the open data set is determined via a simulation process.

10. The method of claim 9 further comprising simulating stress in the object and determining the geometrical part of the object related to the open data set based on a defined stress value.

11. The method of claim 10 wherein the stress value comprises a thermal stress value.

12. The method of claim 10 wherein the stress value comprises a mechanical stress value.

13. The method of claim 1, further comprising generating object information in the at least one open sub-data set, wherein object information comprises identification information for the three-dimensional object.

14. The method of claim 13 wherein the object information comprises a serial number.

15. The method of claim 13 wherein the object information is generated before additively manufacturing the at least one three-dimensional object.

16. The method of claim 13 wherein the object information is generated while additively manufacturing the at least one three-dimensional object.

17. The method of claim 1 wherein at least one open sub-data set comprises an internal geometrical part of the object inside a volume of the three-dimensional object.

18. The method of claim 1 wherein the object specific identification information comprises a serial number.

19. The method of claim 1 wherein the object specific identification information is unique for each of the plurality of three dimensional objects.

* * * * *